US008956447B2

(12) United States Patent
Chen et al.

(10) Patent No.: US 8,956,447 B2
(45) Date of Patent: Feb. 17, 2015

(54) DESICCANT WHEEL DEHUMIDIFIER AND HEAT EXCHANGER THEREOF

(71) Applicant: Norm Pacific Automation Corp., Jhubei City, Hsinchu County (TW)

(72) Inventors: Chin-Huan Chen, Jhubei (TW); Hong-Yang Hsu, Jhubei (TW); Chia-Liang Liu, Jhubei (TW)

(73) Assignee: Norm Pacific Automation Corp., Jhubei, Hsinchu County (TW)

( * ) Notice: Subject to any disclaimer, the term of this patent is extended or adjusted under 35 U.S.C. 154(b) by 135 days.

(21) Appl. No.: 13/739,832

(22) Filed: Jan. 11, 2013

(65) Prior Publication Data

US 2014/0196606 A1 Jul. 17, 2014

(51) Int. Cl.
 *F24F 3/14* (2006.01)
 *B01D 53/26* (2006.01)
 *F28D 1/02* (2006.01)
 *F28D 1/053* (2006.01)
 *B01D 53/06* (2006.01)

(52) U.S. Cl.
 CPC .............. *F28D 1/024* (2013.01); *F24F 3/1411* (2013.01); *F28D 1/0535* (2013.01); *F24F 3/1423* (2013.01); *B01D 53/261* (2013.01); *B01D 53/06* (2013.01)
 USPC .................. 96/125; 96/126; 96/127; 165/177

(58) Field of Classification Search
 CPC .. B01D 53/06; B01D 53/261; B01D 2257/80; F24F 3/1423; F24F 3/1411; F28D 1/024; F28D 1/0233; F28D 1/0535

USPC ......... 96/125–128, 146; 95/113, 123; 34/472, 34/473, 80; 62/94; 236/44 R, 44 C; 165/164–167, 177, DIG. 185
 See application file for complete search history.

(56) References Cited

U.S. PATENT DOCUMENTS

| | | | | |
|---|---|---|---|---|
| 2,285,225 | A * | 6/1942 | Norris | 165/147 |
| 4,926,618 | A * | 5/1990 | Ratliff | 95/10 |
| 5,147,420 | A * | 9/1992 | Claesson | 95/113 |
| 5,443,624 | A * | 8/1995 | Claesson | 95/113 |
| 5,649,428 | A * | 7/1997 | Calton et al. | 62/94 |
| 6,247,323 | B1 * | 6/2001 | Maeda | 62/271 |
| 6,467,535 | B1 * | 10/2002 | Shembekar et al. | 165/140 |
| 6,575,228 | B1 * | 6/2003 | Ragland et al. | 165/54 |
| 7,050,707 | B1 * | 5/2006 | Lin | 392/360 |
| 2006/0131007 | A1 * | 6/2006 | Nies et al. | 165/152 |
| 2006/0283327 | A1 * | 12/2006 | Yoon et al. | 96/143 |
| 2007/0068661 | A1 * | 3/2007 | Yabe et al. | 165/152 |
| 2008/0264620 | A1 * | 10/2008 | Numasawa et al. | 165/177 |
| 2009/0211733 | A1 * | 8/2009 | Tranier et al. | 165/104.21 |

\* cited by examiner

*Primary Examiner* — Frank Lawrence
(74) *Attorney, Agent, or Firm* — Muncy, Geissler, Olds & Lowe, P.C.

(57) ABSTRACT

A heat exchanger of a desiccant wheel dehumidifier, disclosed in the disclosure, includes a frame and multiple heat exchange platy tubes. The frame has an air inlet and an air outlet. The multiple heat exchange platy tubes are fixed on the frame and are substantially arranged side by side with each other. Every two of the multiple heat exchange platy tubes adjacent to each other are separated at an interval from each other to form a first flow channel. Each of the multiple heat exchange platy tubes includes a main body and at least one spacing wall. The main body has multiple second flow channels therein. The at least one spacing wall is located between two of the multiple second flow channels adjacent to each other. The air inlet and the air outlet communicate with the multiple second flow channels.

12 Claims, 4 Drawing Sheets

DESICCANT WHEEL DEHUMIDIFIER AND HEAT EXCHANGER THEREOF

BACKGROUND

1. Technical Field

This disclosure relates to a dehumidifier and a heat exchanger thereof, and more particular to a desiccant wheel dehumidifier and a heat exchanger thereof.

2. Related Art

Generally, a desiccant wheel dehumidifier absorbs moisture from air by the use of a desiccant wheel that includes a main fan for blowing the indoor air passing through the moisture absorption materials, so that the air that is discharged from the dehumidifier is dry and the goal of indoor dehumidification is accomplished. The moisture absorbed by the desiccant wheel is evaporated by the use of heated air from an internal circulating air. The evaporated moisture then enters a heat exchanger to be condensed into water droplets, which are discharged from a water outlet.

The heat exchanger, of the prior arts desiccant wheel dehumidifier, includes a plurality of heat exchange units, which are usually hollow pipelines. But these heat exchange units cannot be closely arranged due to process limitations, so that the overall heat exchange area of the heat exchanger is small, resulting in a poor heat exchange performance. Furthermore, for the structure of a conventional heat exchanger, it is inconvenient to assemble the heat exchange units, thereby increasing the production cost of heat exchangers.

SUMMARY

This disclosure provides a desiccant wheel dehumidifier and a heat exchanger thereof, to solve the problems that heat exchange units of a conventional heat exchanger cannot be closely arranged, they are inconvenient to be assembled, and the rigidity is insufficient.

An embodiment of the disclosure provides a heat exchanger of a desiccant wheel dehumidifier. The heat exchanger comprises a frame and a plurality of heat exchange platy tubes. The frame has an air inlet and an air outlet. The plurality of heat exchange platy tubes are fixed on the frame, and are substantially arranged side by side with each other. Every two of the plurality of heat exchange platy tubes adjacent to each other are separated at an interval from each other to form a first flow channel. Each of the plurality of heat exchange platy tubes includes a main body and at least one spacing wall. The main body has a plurality of second flow channels therein. The at least one spacing wall is located between two of the plurality of second flow channels adjacent to each other. Both the air inlet and the air outlet communicate with the plurality of second flow channels.

Another embodiment of the disclosure provides a heat exchanger of a desiccant wheel dehumidifier. The heat exchanger comprises a frame, an upper grille, a lower grille, a plurality of heat exchange platy tubes. The frame has an air inlet, an air outlet and a liquid outlet. The liquid outlet is located at the bottom of the frame. The upper grille and the lower grille are fixed on the frame respectively. Each of the upper grille and the lower grille includes a plurality of posts. The plurality of heat exchange platy tubes are fixed on the frame. The two opposite ends of the plurality of heat exchange platy tubes are respectively fixed on the upper grille and the lower grille. The plurality of posts are respectively located between every two of the plurality of heat exchange platy tubes adjacent to each other. The plurality of heat exchange platy tubes are substantially arranged side by side with each other. Every two of the plurality of heat exchange platy tubes adjacent to each other are separated at an interval from each other to form a first flow channel. Each of the plurality of heat exchange platy tubes includes a main body and a plurality of spacing walls. The main body has a plurality of second flow channels therein. The plurality of spacing walls are respectively located between two of the plurality of second flow channels adjacent to each other. Both the air inlet and the air outlet communicate with the plurality of second flow channels. The direction of the first flow channel is substantially orthogonal to that of the second flow channel. One end of each of the plurality of heat exchange platy tubes that is close to the bottom of the frame has a guiding slope. The distance between the two of the plurality of spacing walls adjacent to each other is greater than or equal to the thickness of the main body.

Yet another embodiment of the disclosure provides a desiccant wheel dehumidifier. The desiccant wheel dehumidifier comprises a desiccant wheel module, a first airflow generation module, a circulating airflow duct, a second airflow generation module, a heater and a heat exchanger. The desiccant wheel module includes a base and a desiccant wheel pivoted on the base. The first airflow generation module is adapted for providing a first airflow passing through the desiccant wheel. The circulating airflow duct is fixed on the base and has an airflow duct inlet and an airflow duct outlet. The second airflow generation module is connected to the circulating airflow duct and is adapted for providing a second airflow. The heater, connected to the circulating airflow duct, is adapted for heating the second airflow to pass through the desiccant wheel. The heat exchanger, fixed on the base to guide the second airflow from the desiccant wheel, comprises a frame and a plurality of heat exchange platy tubes. The frame has an air inlet, an air outlet and a liquid outlet. The liquid outlet is located at the bottom of the frame. The air inlet is connected to the airflow duct outlet, and the air outlet is connected to the airflow duct inlet. The plurality of heat exchange platy tubes, fixed on the frame, is substantially arranged side by side with each other. Every two of the plurality of heat exchange platy tubes adjacent to each other are separated at an interval from each other to form a first flow channel. Each of the plurality of heat exchange platy tubes includes a main body and at least one spacing wall. The main body has a plurality of second flow channels therein, and the at least one spacing wall is located between two of the plurality of second flow channels adjacent to each other. Both the air inlet and air outlet communicate with the plurality of second flow channels.

According to the desiccant wheel dehumidifier and the heat exchanger thereof in one embodiment mentioned above, the exterior design of the plurality of heat exchange platy tube is a thin-wall hollow body, thus the plurality of heat exchange tubes can be made by means of resin extrusion molding, so as to improve production efficiency.

Furthermore, the plurality of heat exchange platy tubes can be arranged closely with appropriate intervals due to the platy shape, to provide a large heat exchange area within a limited space, thus improving the condensing performance.

In addition, the setting of the plurality of spacing walls can ensure that the plurality of heat exchange platy tubes still have a better structural strength with the shape of thin-wall hollow body, to avoid the plurality of heat exchange platy tubes from deformations during assembly.

Moreover, the structure design of the upper grille and the lower grille also makes the assembling of the heat exchange platy tubes easy, and prevents the leakage from the assembly clearances.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
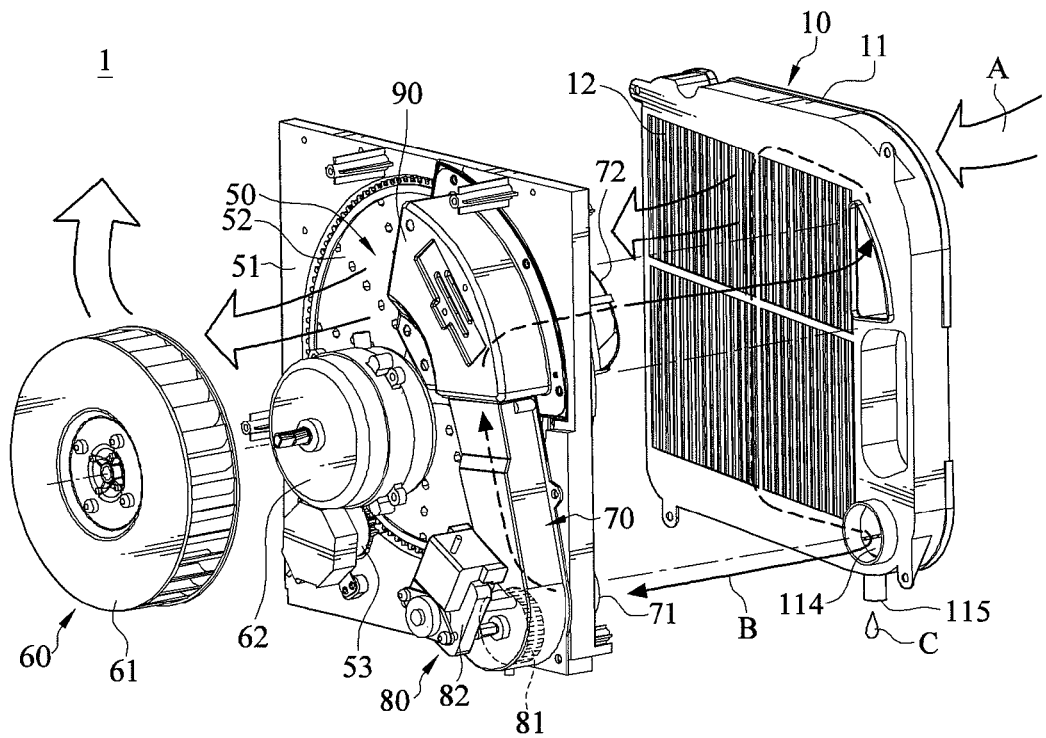
FIG. 1 is a structural exploded view of a desiccant wheel dehumidifier according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a structural exploded view of a desiccant wheel dehumidifier according to one embodiment of the disclosure.

A desiccant wheel dehumidifier 1 of this embodiment comprises a desiccant wheel module 50, a first airflow generation module 60, a circulating airflow duct 70, a second airflow generation module 80, a heater 90 and a heat exchanger 10.

The desiccant wheel module 50 comprises a base 51, a desiccant wheel 52 and a wheel motor 53. The base 51 is substantially a plate with a hole, the desiccant wheel 52 is adapted for being rotatably assembled on the base 51. The wheel motor 53, assembled on the base 51, is adapted for driving the desiccant wheel 52 to rotate.

The first airflow generation module 60 is fixed on the base 51 and is located at one side of the desiccant wheel 52. Typically, the first airflow generation module 60 comprises a first fan blade 61 and a first motor 62. The first motor 62 is assembled on the base 51, and is connected to the first fan blade 61 to drive the first fan blade 61 to rotate, generating a first airflow A. The first airflow A penetrates the heat exchanger 10 and the desiccant wheel 52 sequentially and then is discharged from one side of the desiccant wheel dehumidifier 1.

The circulating airflow duct 70 is fixed on the base 51, and is located at the same side of the desiccant wheel 52 together with the first airflow generation module 60, but is not limited to this disclosure. The opposite two ends of the circulating airflow duct 70 have an airflow duct inlet 71 and an airflow duct outlet 72. Both the airflow duct inlet 71 and the airflow duct outlet 72 are located at the side of the base 51 facing oppositely from the first airflow generation module 60, but the above-mentioned disposing position is not limited to this disclosure.

The second airflow generation module 80 and the heater 90 are respectively located at the two opposite ends of the circulating airflow duct 70, and the heater 90 is disposed at one side of the desiccant wheel 52. The second airflow generation module 80 comprises a second fan blade 81 and a second motor 82. The second motor 82 is connected to the second fan blade 81 that is located inside the circulating airflow duct 70. The second motor 82 is adapted for driving the second fan blade 81 to rotate, generating a second airflow B. The second airflow B circularly flows inside the heat exchanger 10 and the circulating airflow duct 70.

The heat exchanger 10 is fixed on the base 51. The heat exchanger 10 and the heater 90 are respectively located at the two opposite sides of the desiccant wheel 52.

Figure 2:
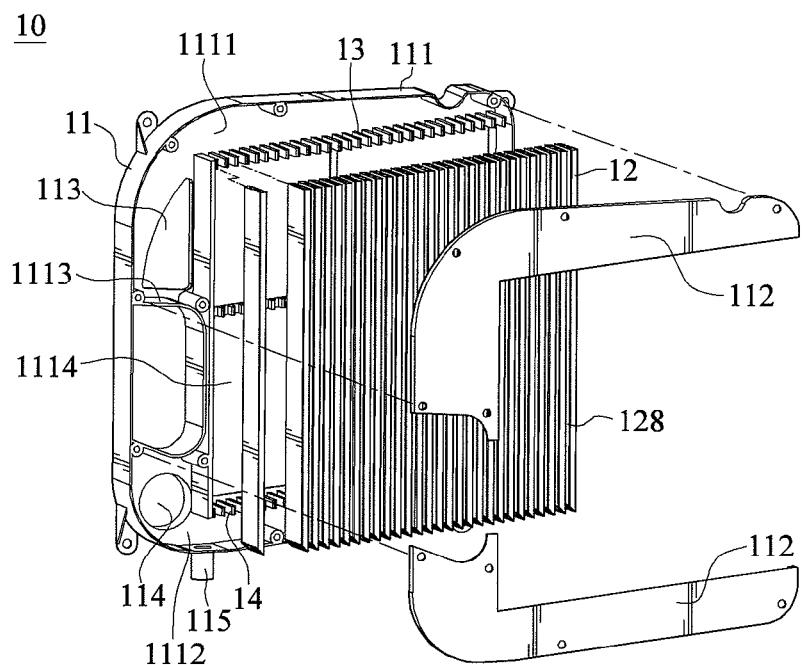
FIG. 2 is a structural exploded view of a heat exchanger in FIG. 1.
Figure 3:
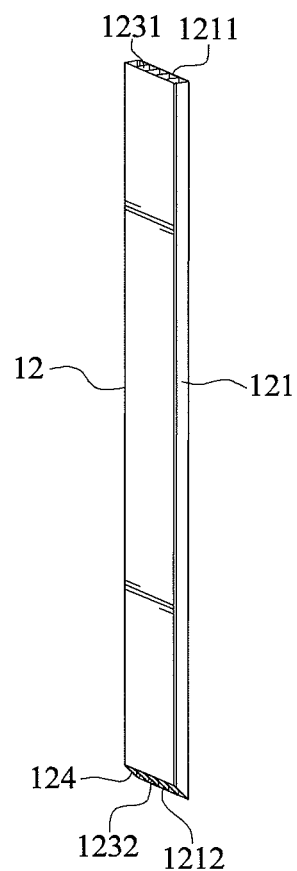
FIG. 3 is a structural view of a plurality of heat exchange platy tubes in FIG. 2.
Figure 4:
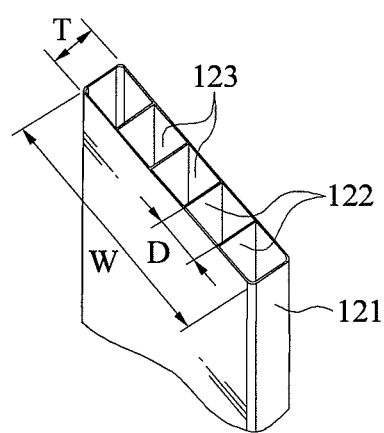
FIG. 4 is a partial enlarged view of the plurality of heat exchange platy tubes in FIG. 3.
Figure 5A:
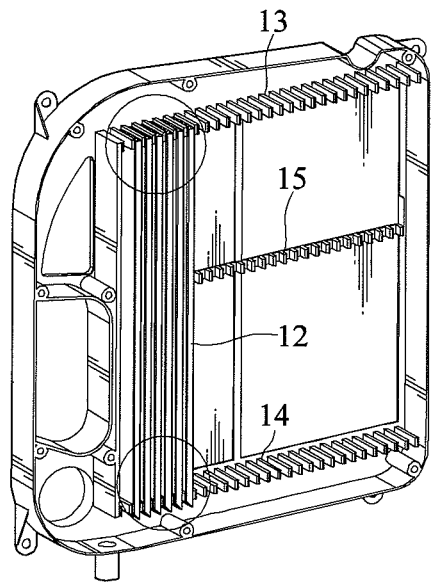
FIG. 5A is a partial structural view of the heat exchanger in FIG. 2.
Figure 5B:
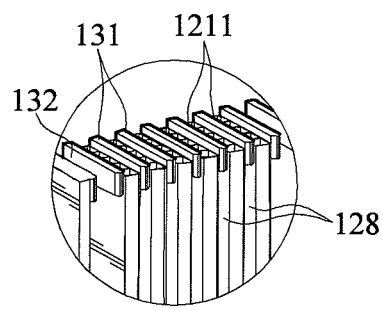
FIG. 5B is a partial enlarged view of the heat exchanger in FIG. 5A.
Figure 5C:
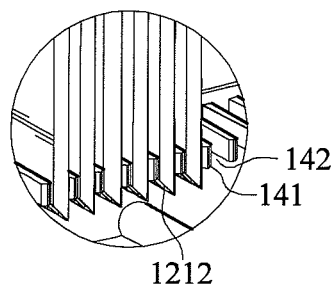
FIG. 5C is a partial enlarged view of the heat exchanger in FIG. 5A.

Please refer to FIG. 2 to FIG. 5C, FIG. 2 is a structural exploded view of a heat exchanger in FIG. 1, FIG. 3 is a structural view of the heat exchange platy tubes in FIG. 2, FIG. 4 is a partial enlarged view of the plurality of heat exchange platy tubes in FIG. 3, FIG. 5A is a partial structural view of the heat exchanger in FIG. 2, FIG. 5B is a partial enlarged view of the heat exchanger of FIG. 5A, and FIG. 5C is a partial enlarged view of the heat exchanger of FIG. 5A.

Typically, as shown in FIG. 2, the heat exchanger 10 comprises a frame 11, an upper grille 13, a lower grille 14 and a plurality of heat exchange platy tubes 12.

The frame 11 comprises a frame body 111 and two covers 112. The frame 11 has an air inlet 113, an air outlet 114 and at least one liquid outlet 115. The at least one liquid outlet 115 is located at the bottom of the frame 11. The air inlet 113 is connected to the airflow duct outlet 72, and the air outlet 114 is connected to the airflow duct inlet 71. Moreover, in this embodiment, the air inlet 113 is close to the top of frame 11, and the air outlet 114 is close to the bottom of frame 11, but the relative positions of the air inlet 113 and the air outlet 114 are not used to limit this disclosure. Furthermore, the air inlet 113, the air outlet 114 and the liquid outlet 115 are all formed on the frame body 111. Additionally, the frame body 111 further has a separator 1113 and an opening 1114. The separator 1113 is located between the air inlet 113 and the air outlet 114, to separate them from each other.

The two covers 112 are respectively assembled on the top and the bottom of the frame body 111, so as to, together with the frame body 111, form an inlet flow channel 1111 and an outlet flow channel 1112. The inlet flow channel 1111 is between the opening 1114 and the air inlet 113. The outlet flow channel 1112 is between the opening 1114 and the air outlet 114.

The upper grille 13 and the lower grille 14 are both fixed on the frame body 111 of the frame 11, and are respectively located at the upper and lower end edges of the opening 1114.

The plurality of heat exchange platy tubes 12 are arranged side by side (namely, in parallel) on the upper grille 13 and the lower grille 14, thus are arranged on the opening 1114. An interval is kept between two of the plurality of heat exchange platy tubes 12 adjacent to each other to form a first flow channel 128. The first flow channel 128 is adapted for the first airflow A passing through.

Typically, as shown in FIG. 5B, the upper grille 13 comprises a plurality of posts 131, which are arranged side by side, and there is a clearance 132 between the two posts 131 adjacent to each other. As shown in FIG. 5C, the lower grille 14 includes a plurality of posts 141 arranged side by side, and there is a clearance 142 between the two posts 141 adjacent to each other. As shown in FIG. 4, each of the heat exchange platy tubes 12 includes a main body 121 and a plurality of spacing walls 122. The shape of the main body 121 is substantially a hollow tube. The main body 121 has a first end 1211 and a second end 1212 that are mutually opposite to each other. The plurality of spacing walls 122 are assembled in the main body 121 with equal intervals, and each of the plurality of spacing walls 122 extends from the first end 1211 to the second end 1212, so as to form a plurality of second flow channels 123 correspondingly on the main body 121. The second flow channels 123 are adapted for the second airflow B passing through. Furthermore, the second flow channels 123 are substantially orthogonal to the first flow channel 128, but are not limited to this. The exterior design of the plurality of heat exchange platy tubes 12 is a thin-wall hollow body, thus they can be made by means of resin extrusion molding, so as to improve production efficiency. In addition, the setting of the plurality of spacing walls 122 can ensure that the heat exchange platy tubes 12 still have a better structural strength with the shape of the thin-wall hollow body, to avoid the heat exchange platy tubes from deformations during assembly.

Furthermore, as shown in FIGS. 5A, 5B and 5C, the plurality of first ends 1211 and the plurality of second ends 1212 of the plurality of heat exchange platy tubes 12 are respectively assembled on the clearance 132 and the clearance 142. That is to say, the plurality of posts 131 are located between the two first ends 1211 of the two heat exchange platy tubes 12 adjacent to each other, and the plurality of posts 141 are located between the two second ends 1212 of the two heat exchange platy tubes 12 adjacent to each other. Additionally, both the distance (i.e., the width of clearance 132) between two of the plurality of posts 131 adjacent to each other and the distance (i.e., the width of clearance 142) between two of the plurality of posts 141 adjacent to each other can be slightly less than the thickness of the plurality of heat exchange platy tubes 12, so that the two opposite ends of the heat exchange platy tubes 12 are tightly coupled to the upper grille 13 and the lower grille 14. As a result, it can avoid the second airflow B from leaking from the assembly clearances between the plurality of heat exchange platy tubes 12 and the upper grille 13 or the lower grille 14.

As shown in FIG. 2, when the plurality of heat exchange platy tubes 12 are assembled on the upper grille 13 and the lower grille 14, the air inlet 113 of the frame 11 communicates with the inlet flow channel 1111 and is connected to the inlet 1231 of the second flow channel 123, and the air outlet 114 of the frame 11 communicates with the outlet flow channel 1112 and is connected to the outlet 1232 of the second flow channel 123.

Please also refer to FIG. 1, the first fan blade 61 rotates to generate the first airflow A when the desiccant wheel dehumidifier 1 operates. The first airflow A sequentially penetrates through the first flow channel 128 between the plurality of heat exchange platy tubes 12 and the desiccant wheel 52, and the desiccant wheel 52 absorbs the moisture from the first airflow A, so that the desiccant wheel 52 discharges the first airflow A that becomes dry. The second fan blade 81 operates such that the second airflow B circulates inside the heat exchanger 10 and the circulating airflow duct 70. When the second airflow B flows through the heater 90 to become a high-temperature airflow, the second airflow B will pass through the desiccant wheel 52 to evaporate the moisture therein, thereby restoring the moisture absorption capacity of the desiccant wheel 52. Next, the vapor, together with the second airflow B, flows through the plurality of second flow channels 123 in the plurality of heat exchange platy tubes 12 for a heat exchange with cold air outside (e.g. the first airflow A), so that the vapor is condensed into water droplets C in the plurality of second flow channels 123 of the plurality of heat exchange platy tubes 12, and the water droplets C further penetrates through the liquid outlet 115 located at the bottom of the frame 11 and then is discharged from the heat exchanger 10. Thus, a dehumidifying effect is achieved for the desiccant wheel dehumidifier 1.

Additionally, as shown in FIG. 4, the cross section of the heat exchange platy tubes 12, in this embodiment mentioned above, has a width W and a thickness T, and the distance D between the two of the plurality of spacing walls 122 adjacent to each other is greater than or equal to the thickness T, which is a predetermined size and can be greater than 4 millimeters (mm), so that the plurality of second flow channels 123 are wide enough to allow at least one water droplet passing through, thereby avoiding the droplets, condensed in the plurality of second flow channels 123, from blocking therein and having an unsmooth discharge. In this embodiment, the thickness T is not used to limit this disclosure, and is also dependent on the surface tension of water droplets on the plurality of heat exchange platy tubes 12.

Furthermore, as shown in FIG. 5A, in this embodiment or some other embodiments, the heat exchanger 10 further comprises a middle grille 15, which is located at the opening 1114 of the frame body 111 as well as between the upper grille 13 and the lower grille 14. The middle grille 15 is adapted for fixing the middle segment of the plurality of heat exchange platy tubes 12, in order to improve the jointing stability of the plurality of heat exchange platy tubes 12 and the frame body 111.

Moreover, in this embodiment or some other embodiments, one end of each of the plurality of heat exchange platy tubes 12 that is close to the bottom of the frame 11 has a guiding slope 124, as indicated in FIG. 3, i.e., the location at the opening 1232 of each of the plurality of second flow channels 123. Thus, the water droplets can be guided out due to the design of guiding slope 124, so the droplets condensed in the plurality of second flow channels 123 can be discharged smoothly.

Moreover, the exterior design of the plurality of heat exchange platy tubes 12 is a thin-wall hollow body, thus the plurality of heat exchange platy tubes 12 can be arranged closely with appropriate intervals, to provide a large heat exchange area within a limited space, thus improving the condensing performance.

Figure 6:
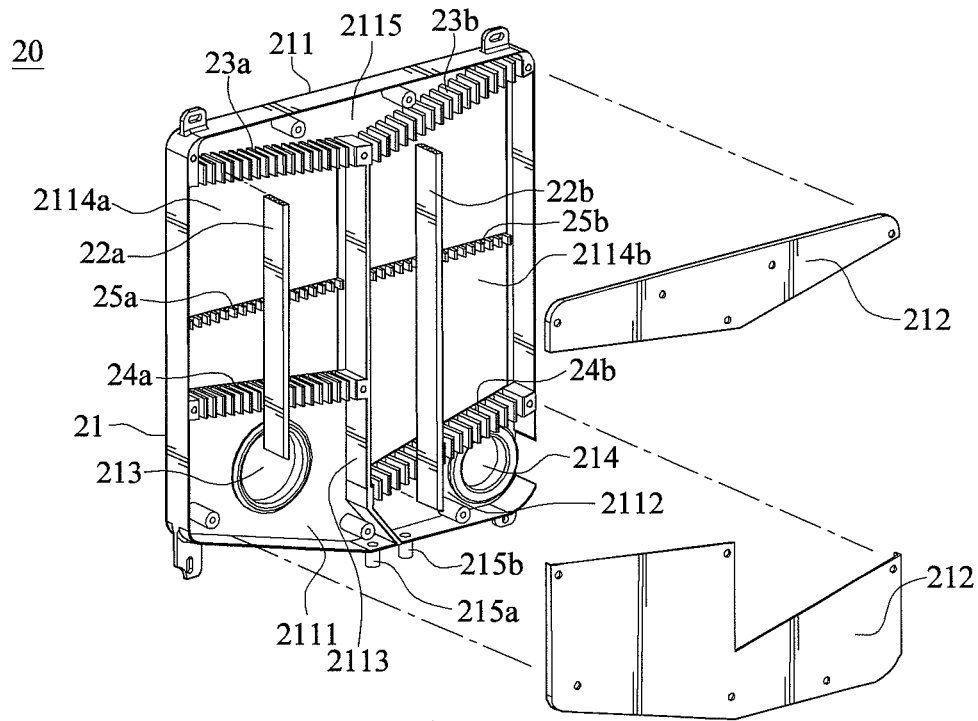
FIG. 6 is a structural exploded view of a heat exchanger in another embodiment of this disclosure.

Please refer to FIG. 6, which is a structural exploded view of a heat exchanger in another embodiment of the disclosure.

In this embodiment, the operation principle of a heat exchanger 20 is approximately the same with that of the embodiment in FIG. 2, and only the differences are described in the following.

In this embodiment, the heat exchanger 20 comprises a frame 21, two upper grilles 23a and 23b, two middle grilles 25a and 25b, two lower grilles 24a and 24b and a plurality of heat exchange platy tubes 22a and 22b.

The frame 21 comprises a frame body 211 and two covers 212. The frame body 21 has an air inlet 213, an air outlet 214 and two liquid outlets 215a and 215b. The two liquid outlets 215a and 215b are located at the bottom of the frame 21. Additionally, in this embodiment, the air inlet 213 and the air outlet 214 are both close to the bottom of the frame 21. Furthermore, the air inlet 213, the air outlet 214 and the two liquid outlets 215a and 215b are located on the frame body 211. Also, the frame body 211 has a separator 2113 and two openings 2114a and 2114b. The separator 2113 is located between the air inlet 213 and the air outlet 214 to separate them from each other. The two opening 2114a and 2114b are arranged side by side. The area of the opening 2114a can be smaller than that of the opening 2114b, but is not limited to this disclosure.

The two covers 212 are respectively assembled on the top and the bottom of the frame body 211, so as to, together with the frame body 211, form an inlet flow channel 2111, a connected flow channel 2115 and an outlet flow channel 2112. The upper grille 23a, the middle grille 25a and the lower grille 24a are fixed on the frame body 211 of the frame 21. The upper grille 23a and the lower grille 24a are located at the upper and the lower end edges of the opening 2114a respectively. The middle grille 25a is located between the upper grille 23a and the lower grille 24a. The upper grille 23b, the middle grille 25b and the lower grille 24b are fixed on the frame body 211 of the frame 21. The upper grille 23b and the lower grille 24b are located at the upper and the lower end edges of the opening 2114b, respectively. The middle grille 25b is located between the upper grille 23b and the lower grille 24b.

The length of the plurality of heat exchange platy tubes 22a can be smaller than that of the plurality of heat exchange platy tubes 22b, but is not limited to this disclosure. The plurality of heat exchange platy tubes 22a are arranged side by side on the upper grille 23a, the middle grille 25a and the lower grille 24a, while the plurality of heat exchange platy tubes 22b are arranged side by side on the upper grille 23b, the middle grille 25b and the lower grille 24b. Therefore, the airflow flows in or out of the heat exchanger 20 sequentially through the air inlet 213, the inlet flow channel 2111, the plurality of heat exchange platy tubes 22a, the connected flow channel 2115, the plurality of heat exchange platy tubes 22b, the outlet flow channel 2112 and the air outlet 214.

The structures of the plurality of heat exchange platy tubes 22a and 22b are approximately the same with those of the plurality of heat exchange platy tubes 12 in FIG. 2, while the structures of the two upper grilles 23a and 23b, the two middle grilles 25a and 25b, and the two lower grilles 24a and 24b are approximately the same with those of the upper grille 13, the middle grille 15 and the lower grille 14, so it is unnecessary to repeatedly describe the structures of the heat exchange platy tubes 22a and 22b, the two upper grilles 23a and 23b, the two middle grilles 25a and 25b, and the two lower grilles 24a and 24b any more here.

As a consequence of the above, the biggest difference between the heat exchanger 20 in this embodiment and the heat exchanger 10 in FIG. 2 is that the air inlet 213 and the air outlet 214 are both close to the bottom of the frame 21, and have the two liquid outlets 215a and 215b.

Figure 7:
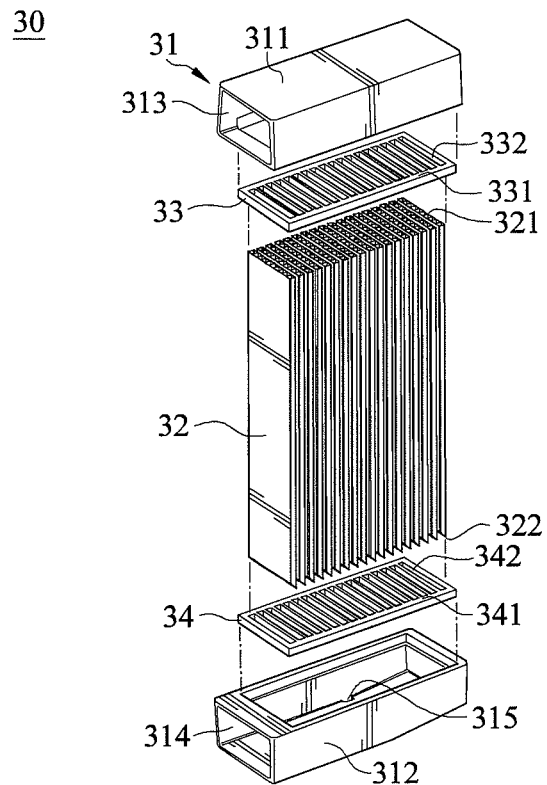
FIG. 7 is a structural exploded view of a heat exchanger according to yet another embodiment of this disclosure.

Please refer to FIG. 7, which is a structural exploded view of a heat exchanger according to yet another embodiment of this disclosure.

In this embodiment, a heat exchanger 30 and the operation principle of the heat exchanger 30 are approximately the same with those of the embodiment of FIG. 2, and only the differences are described in the following.

The heat exchanger 30 in this embodiment comprises a frame 31, an upper grille 33, a lower grille 34 and a plurality of heat exchange platy tubes 32.

The frame 31 comprises an upper frame body 311 and a lower frame body 312. An air inlet 313 is located on the upper frame body 311. An air outlet 314 and a liquid outlet 315 are located on the lower frame body 312. The upper grille 33 is fixed on the upper frame body 311. The lower grille 34 is fixed on the lower frame body 312. The two opposite ends of the heat exchange platy tubes 32 are respectively fixed on the upper grille 33 and the lower grille 34.

In this embodiment, the upper grille 33 includes a plurality of posts 331 that are arranged side by side, and there is a clearance 332 between the two posts 331 adjacent to each other. The lower grille 34 includes a plurality of posts 341 that are arranged side by side, and there is a clearance 342 between the two of the plurality of posts 331 adjacent to each other. The plurality of posts 331 are respectively located between the first ends 321 of every two of plurality of heat exchange platy tubes 32, while the plurality of posts 341 are respectively located between the second ends 322 of every two of the plurality of heat exchange platy tubes 32, to keep a distance between the two of the plurality of heat exchange platy tubes 32 adjacent to each other.

The structures of the plurality of heat exchange platy tubes 32 are approximately the same with those of the plurality of heat exchange platy tubes 12 in FIG. 2, so it is unnecessary to repeat the structures of the plurality of heat exchange platy tubes 32 any more here.

According to the desiccant wheel dehumidifier and the heat exchanger thereof in one embodiment mentioned above, the exterior design of the plurality of heat exchange platy tubes is a thin-wall hollow body, thus the plurality of heat exchange platy tubes can be made by means of resin extrusion molding, so as to improve production efficiency.

Furthermore, the plurality of heat exchange platy tubes can be arranged closely with appropriate intervals due to the platy shape, to provide a large heat exchange area within a limited space, thus improving the condensing performance.

In addition, the setting of the plurality of spacing walls can ensure that the plurality of heat exchange platy tubes still have a better structural strength with the shape of thin-wall hollow body, to avoid the plurality of heat exchange platy tubes from deformations during assembly.

Moreover, the structure design of the upper grille and the lower grille also makes the assembling of the heat exchange platy tubes easy, and prevents the leakage from the assembly clearances.

What is claimed is:

1. A heat exchanger of a desiccant wheel dehumidifier, comprising:
 a frame having an air inlet and an air outlet; and
 a plurality of heat exchange platy tubes fixed on the frame, and substantially arranged side by side with each other; wherein every two of the plurality of heat exchange platy tubes adjacent to each other are separated at an interval from each other to form a first flow channel, each of the plurality of heat exchange platy tubes includes a main body and at least one spacing wall; the main body has a plurality of second flow channels therein, and the at least one spacing wall is located between two of the plurality of second flow channels adjacent to each other, and both the air inlet and the air outlet communicate with the plurality of second flow channels, one end of each of the plurality of heat exchange platy tubes that is close to the bottom of the frame has a guiding slope.

2. The heat exchanger of the desiccant wheel dehumidifier according to claim 1, wherein the bottom of the frame has at least one liquid outlet.

3. The heat exchanger of the desiccant wheel dehumidifier according to claim 1, wherein the direction of the first flow channel is substantially orthogonal to that of the plurality of second flow channels.

4. The heat exchanger of the desiccant wheel dehumidifier according to claim 1, wherein each of the plurality of heat exchange platy tubes includes the plurality of spacing walls, and the distance between two of the plurality of spacing walls adjacent to each other is greater than or equal to the thickness of the main body, and the thickness of the main body has a predetermined size so that the plurality of second flow channels are capable of allowing at least one water droplet to pass through.

5. The heat exchanger of the desiccant wheel dehumidifier according to claim 1, wherein the two opposite ends of the plurality of heat exchange platy tubes are respectively close to the top and the bottom of the frame, the air inlet is close to the top of the frame, and the air outlet is close to the bottom of the frame.

6. The heat exchanger of the desiccant wheel dehumidifier according to claim 1, wherein the two opposite ends of the plurality of heat exchange platy tubes are respectively close to the top and the bottom of the frame, and the air inlet and the air outlet are both close to the bottom of the frame.

7. The heat exchanger of the desiccant wheel dehumidifier according to claim 1, further comprising an upper grille and a lower grille, fixed on the frame; wherein the two opposite ends of the plurality of heat exchange platy tubes are respectively fixed on the upper grille and lower grille, and each of the upper grille and lower grille includes a plurality of posts respectively, located between every two of the plurality of heat exchange platy tubes adjacent to each other.

8. The heat exchanger of the desiccant wheel dehumidifier according to claim 7, further comprising a middle grille, located on the frame and between the upper grille and the lower grille.

9. The heat exchanger of the desiccant wheel dehumidifier according to claim 1, wherein the frame includes an upper frame body and a lower frame body, the air inlet is located at the upper frame body, the air outlet is located at the lower frame body, and the plurality of heat exchange platy tubes are disposed between the upper frame body and the lower frame body.

10. The heat exchanger of the desiccant wheel dehumidifier according to claim 9, further comprising an upper grille fixed on the upper frame body and a lower grille fixed on the lower frame body, wherein the two opposite ends of the plurality of heat exchange platy tubes are respectively fixed on the upper grille and the lower grille, each of the upper grille and the lower grille includes a plurality of posts respectively, located between every two of the plurality of heat exchange platy tubes adjacent to each other.

11. A heat exchanger of a desiccant wheel dehumidifier, comprising:
  a frame having an air inlet, an air outlet and a liquid outlet, and the liquid outlet being located at the bottom of the frame;
  an upper grille and a lower grille fixed on the frame respectively, and each of the upper grille and the lower grille including a plurality of posts; and
  a plurality of heat exchange platy tubes fixed on the frame, and two opposite ends of the plurality of heat exchange platy tubes being respectively fixed on the upper grille and the lower grille, wherein the plurality of posts are respectively located between every two of the plurality of heat exchange platy tubes adjacent to each other, the plurality of heat exchange platy tubes are substantially arranged side by side with each other, wherein every two of the plurality of heat exchange platy tubes adjacent to each other are separated at an interval from each other to form a first flow channel, each of the plurality of heat exchange platy tubes includes a main body and a plurality of spacing walls, the main body has a plurality of second flow channels therein, and the plurality of spacing walls are respectively located between two of the plurality of second flow channels adjacent to each other, the air inlet and the air outlet communicate with the plurality of second flow channels, the direction of the first flow channel is substantially orthogonal to that of the plurality second flow channels, one end of each of the plurality of heat exchange platy tubes that is close to the bottom of the frame has a guiding slope; and the distance between the two of the plurality of spacing walls adjacent to each other is greater than or equal to the thickness of the main body.

12. A desiccant wheel dehumidifier, comprising:
  a desiccant wheel module including a base and a desiccant wheel pivoted on the base;
  a first airflow generation module for providing a first airflow passing through the desiccant wheel:
  a circulating airflow duct fixed on the base and having an airflow duct inlet and an airflow duct outlet;
  a second airflow generation module connected to the circulating airflow duct and for providing a second airflow;
  a heater connected to the circulating airflow duct for heating the second airflow to pass through the desiccant wheel; and
  a heat exchanger fixed on the base to guide the second airflow from the desiccant wheel, and the heat exchanger including:
    a frame having an air inlet, an air outlet and a liquid outlet, the liquid outlet being located at the bottom of the frame, wherein the air inlet is connected to the airflow duct outlet, and the air outlet is connected to the airflow duct inlet; and
    a plurality of heat exchange platy tubes, fixed on the frame, and substantially arranged side by side with each other; wherein every two of the plurality of heat exchange platy tubes adjacent to each other are separated at an interval from each other to form a first flow channel, each of the plurality of heat exchange platy tubes includes a main body and at least one spacing wall, the main body has a plurality of second flow channels therein, and the at least one spacing wall is located between two of the plurality of second flow channels adjacent to each other, and both the air inlet and air outlet communicate with the plurality of second flow channels, one end of each of the plurality of heat exchange platy tubes that is close to the bottom of the frame has a guiding slope.

* * * * *